United States Patent [19]

Balch

[11] 3,728,045

[45] Apr. 17, 1973

[54] HELICOPTER BLADE

[75] Inventor: David T. Balch, Monroe, Conn.

[73] Assignee: United Aircraft Corporation, East Hartford, Conn.

[22] Filed: Sept. 22, 1971

[21] Appl. No.: 182,777

[52] U.S. Cl. ................................................ 416/223
[51] Int. Cl. .............................................. B64c 27/46
[58] Field of Search ................. 416/223, 228, 144, 416/226

[56] References Cited

UNITED STATES PATENTS

| | | | |
|---|---|---|---|
| 1,692,081 | 11/1928 | Cierva | 416/237 X |
| 2,152,861 | 4/1939 | Bennett | 416/145 |
| 2,475,337 | 7/1949 | Platt | 416/144 UX |
| 3,065,933 | 11/1962 | Williams | 416/228 X |
| 3,066,742 | 12/1962 | Castles | 416/240 |
| 3,173,490 | 3/1965 | Stuart | 416/223 |
| 3,392,788 | 7/1968 | Covington et al. | 416/226 X |

Primary Examiner—Everette A. Powell, Jr.
Attorney—Vernon F. Hauschild

[57] ABSTRACT

To alleviate the roll moment established during helicopter forward flight, it is necessary to vary the blade pitch angle around the azimuth with reduced angle on the advancing side and increased angle on the retreating side. To accomplish this without the introduction of unreasonable losses in lift capability and stability and without an undue increase in drag, the blade airfoil section is selectively shaped so as to delay or minimize blade flow separation, and high Mach number compressibility effects.

10 Claims, 4 Drawing Figures 3,728,045

HELICOPTER BLADE

CROSS-REFERENCE TO RELATED APPLICATIONS

Some of the subject matter of this application is disclosed and claimed in the copending applications of Robert A. Monteleone entitled "Blade for High Speed Helicopter" (Ser. No. 182,776) and W. Donald Jepson entitled "Helicopter Blade," (Ser. No. 182,618) filed on even date herewith.

BACKGROUND OF THE INVENTION

1. Field of Invention

This invention relates to helicopter blades and more particularly to the shaping or contouring of helicopter blades in cross section so as to benefit from the blade pitch changes necessary to relieve the roll moment created by a helicopter rotor during forward flight by minimizing an undue loss of lift and aircraft stability, and without an undue increase in drag.

2. Description of the Prior Art

In the helicopter blade art, almost all blades have been fabricated so as to conform in cross-sectional or airfoil shape to National Advisory Committee for Aeronautics designations, particularly the NACA 0012. Few helicopters have utilized blades which differ from the standard NACA 0012 airfoil shape and the blades of some of these particular helicopters are discussed hereinafter and compared from a shape standpoint with the blade taught herein. The airfoils of these distinguishing blades are designated by the NACA system as follows: NACA 23008.75, NACA 23010-1.56 and NACA 21006.

SUMMARY OF THE INVENTION

The primary object of the present invention is to provide an improved helicopter blade which has sufficient strength to carry the required rotor loads, and which will minimize the penalties experienced in forward helicopter flight due to the differing lift capabilities of the advancing and retreating blades with minimum loss of lift capability, with minimum increase in drag, and without generating instability problems.

Through the teaching of the present invention, the requirement of minimum loss of lift capability is met with a high lift capability airfoil. This is accomplished by delaying or minimizing blade leading edge and blade trailing edge flow separation. The leading edge separation is delayed by selectively shaping the blade to reduce the adverse pressure gradients in the region of the leading edge. The trailing edge separation is minimized by selectively shaping the blade to reduce the airfoil surface slope and high rearward suction pressures to a minimum.

In accordance with the present invention, a helicopter blade is made of selective cross-sectional or airfoil shape so as to improve the performance of the helicopter by increasing the lift capability of the rotor, reducing rotor drag, and increasing the drag divergence Mach number of the rotor airfoil section.

It is still a further object of this invention to teach an airfoil section which produces these advantages, in addition to producing a highly effective and stable helicopter rotor.

It is a further object of this invention to teach such a helicopter airfoil section which is cambered and which utilizes camber in combination with thickness to increase the blade lifting capability and to also minimize the rotor pitching moment and to minimize rotor drag.

It is a further object of this invention to teach a helicopter blade airfoil whose thickness is about 9.5 percent chord dimension and whose maximum camber is about $0.8 \pm 0.05$ percent chord dimension and located forward of the 30 percent chord station, preferably about the 27 percent chord station, to thereby produce low blade pitching moments without sacrificing higher maximum lift coefficient and drag divergence aerodynamic characteristics.

It is still a further object of this invention to provide such a helicopter blade airfoil section shaped to produce a blade pitching moment coefficient within the range $\pm 0.03$ before moment divergence at all Mach numbers below 0.75.

Other objects and advantages of the present invention may be seen by referring to the following description and claims, read in conjunction with the accompanying drawings.

DESCRIPTION OF THE PREFERRED EMBODIMENT

Figure 1:
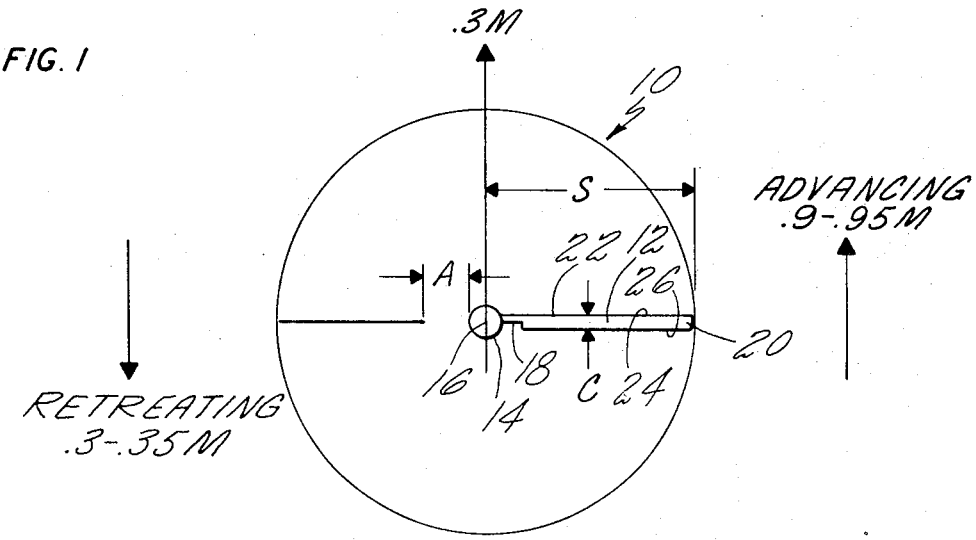
FIG. 1 is a schematic showing of a helicopter rotor which demonstrates the potential roll moment generation problem experienced by helicopters in forward flight and which increases as forward flight speed increases.

Referring to FIG. 1 we see a schematic of a helicopter rotor 10 which consists of a plurality of equally spaced blades 12 mounted for rotation with rotor hub 14 about axis of rotation 16. Each blade 12 is preferably identical to the single blade illustrated in FIG. 1 and includes a root portion 18, which connects to hub 14, a tip portion 20, which is the portion of the blade farthest from the axis of rotation and which therefore travels at the highest rotational speed, and center portion 22 extending therebetween and cooperating therewith in defining blade span S. Each of blades 12 has a leading edge 24, a trailing edge 26, a chord dimension C and a thickness (not shown) extending perpendicular to the chord. Blade 12 is airfoil in cross section and generates lift during rotation. Rotor 10, hub 14 and blades 12 may be of the type disclosed in greater particularly in U.S. Pat. Nos. 3,097,701 and 2,754,918.

When the helicopter is hovering, all blades are rotating at the same velocity and therefore generate the same lift when at the same pitch so that no roll moment is experienced during the hover mode of operation. The out of balance lift potential which could lead to an objectionable roll moment is experienced during the forward flight mode of operation, and the potential roll moment becomes more intense as flight speed increases. For purposes of illustration, and as shown in FIG. 1, the helicopter is considered to be flying forward at 0.3 Mach number and the blades 12 are considered to be rotating at a rotational speed between 0.6 and 0.65 Mach number during this forward flight mode of operation. The advancing blades, which are traveling in the same direction as the helicopter, experience an increased relative speed which is the sum of the blade rotational speed and the forward flight speed or 0.9 to 0.95 Mach number. Conversely, the retreating blades experience a reduced relative speed in that their relative speed is now the difference between the blades rotational speed and the helicopter forward speed, or 0.3 to 0.35 Mach number. It should also be noted that the inner portion A of the retreating blade experiences little or no relative velocity and therefore generates little effective lift so that the potential roll moment problem is compounded by the fact that the retreating blade is not only operating at a lower relative velocity than the advancing blade, but is of diminished effective lift generating surface to the advancing blade. For these two reasons, it will be evident that the advancing blade could generate substantially more lift than the retreating blade and therefore a roll moment could be imposed by rotor 10 upon the helicopter about the helicopter fore-and-aft axis.

It is normal practice on a helicopter to eliminate this lift inequality by reducing the pitch angle (and lift) on the advancing blade and increase the pitch angle (and lift) on the retreating blade.

It is the object of this invention to aid this roll moment alleviation by selectively contouring the airfoil shaped cross section of blade 12 to increase the maximum lift capability with minimum stability reduction and minimum drag creation.

To alleviate or minimize this lift inequality, it is essential that the advancing blades be feathered to a low pitch and that the retreating blades be feathered to a high pitch. Utilizing the airfoil cross section of my invention, the high Mach number advancing blades will be permitted to operate at a required low pitch with minimum drag, and the relatively low Mach number retreating blades will be permitted to operate at the required high pitch without blade stall, which is another form of drag. In addition, my blade is contoured so that this is accomplished without introducing severe pitching moments or motion into the airfoil or without introducing other instability.

How to accomplish these desired airfoil characteristics is a difficult problem. For example, it is well known that the lifting power of the slow moving retreating blades may be increased, up to a point, by increasing blade thickness, however, an increase in blade thickness would produce very severe drag problems in the advancing blades. Conversely, it is known that drag can be reduced on the high speed advancing blades by reducing their thickness, that is, thinning the blades, however, thinning the blades severely adversely affects the lifting power of the slower retreating blades. It is accordingly my objective to produce a blade with an airfoil shape which will effect a compromise so as to increase the lifting power of the retreating blades, while minimizing advancing blade drag.

By means of mathematical analysis, experimentation, and the analyzing of test results, I have developed a helicopter blade of selected cross-sectional or airfoil shape which accomplishes these objectives and whose advantage in this regard over the standard NACA 0012 blade and the aforementioned blades more similar thereto can be sustained.

It is conventional to define an airfoil shape by defining the location of the upper airfoil surface and the lower airfoil surface at a series of stations along the blade chord, and then defining the leading edge radius. For example, this is illustrated in the publication "Theory of Wing Selections" by Abbott and Von Doenhoff published by Dover Publications, Inc., New York, copyright 1959, and an illustration of this standard method of airfoil definition will be found at page 412 thereof.

The following table defines my airfoil for any blade thickness:

| X/C | $Y_u/t$ | $Y_L/t$ |
|---|---|---|
| 0.0125 | 0.1863 | −.1526 |
| 0.025 | 0.2779 | −.221 |
| 0.05 | 0.387 | −.2993 |
| 0.075 | 0.45 | −.3395 |
| 0.1 | 0.4926 | −.3642 |
| 0.15 | 0.5442 | −.3937 |
| 0.2 | 0.5834 | −.4087 |
| 0.25 | 0.5842 | −.4147 |
| 0.3 | 0.5815 | −.4122 |
| 0.4 | 0.5578 | −.3959 |
| 0.5 | 0.5109 | −.3627 |
| 0.6 | 0.4434 | −.3145 |
| 0.7 | 0.3553 | −.2509 |
| 0.8 | 0.2486 | −.1745 |
| 0.9 | 0.13 | −.0909 |
| 0.975 | 0.0345 | −.0244 | upper leading edge radius: $(\rho_u/c) = (t/c)^2 \, 1.108$
lower leading edge radius: $(\rho_L/c) = (t/c)^2 \, 0.7313$
where X is a station along the blade chord, where C is the blade chord, where $Y_u$ is the coordinate or location of the upper airfoil surface from the blade chord at station X, where $Y_L$ is the coordinate or location of the lower airfoil from the chord line at station X, where $t$ is maximum blade thickness, where $\rho_u$ is the radius of the upper airfoil leading edge taken from a point on the chord line, and where $\rho_L$ is the radius of the lower airfoil leading edge taken from a point on the chord line.

To assist in the understanding of the table given above, it will be helpful to take hypothetical situation in which this table will be used to establish a location of the upper and lower airfoil surfaces, $Y_u$ and $Y_L$ at a particular chord station X for a blade of a selected thickness and a selected chord dimension. The following example will illustrate use of the chart to determine the location of $Y_u$ and $Y_L$ for the station 0.0125 the chord distance along the chord commencing at the leading edge, for a blade having a maximum thickness of 2 inches and a chord of 20 inches.

The only step necessary in determining $Y_u$ is to multiply the $Y_u/t$ chart or table entry corresponding to the 0.0125 chord station entry, i.e., 0.1865, by the blade maximum thickness, i.e., 2 inches, so as to give a product of 0.03726 inches. This product constitutes the upper airfoil location, i.e., $Y_u$. Accordingly, we have determined that at chord station 0.0125, the upper airfoil location, $Y_u$ is 0.3726 inches above the chord line.

The same procedure would be followed to ascertain the distance $Y_L$ at chord station 0.0125 and, because the entries under the $Y_L/t$ column are in the negative, the quantity so determined would be positioned at the 0.0125 chord station and below the chord line. Following this procedure, we would establish $Y_u$ and $Y_L$ for all of the indicated chord stations in the X/C column.

We must next determine the leading edge radius of the upper airfoil surface, $\rho_u$, and the leading edge radius of the lower air-foil section $\rho_L$. We this time follow a two step procedure. In the first step we multiply the blade maximum thickness-to-chord ratio [$t/c$ = 2"/20" =0.1]squared by the quantity 1.108, i.e., $(0.1)^2$ multiplied by 1.108, which equals 0.01108. This first product represents the upper airfoil leading edge radius $\rho_u$ divided by chord C. The second step is to multiply the first product by the chord dimension, i.e., 0.01108 times 20 inches, which gives us the second product of 0.2216, which is the upper airfoil surface leading edge radius in the dimension of the chord, namely, inches, and taken from a point on the chord. The lower leading edge radius $\rho_L$ is computed in the same fashion.

It will be evident from the above description that all quantities listed in the $Y_u/t$ and the $Y_L/t$ columns assume a chord dimension of 1. If we are to determine the coordinates for a blade which has a chord other than one, we must accordingly multiply the chart quantities in each of these two columns by the chord dimension.

By utilizing the table given above, we can determine the coordinates of the airfoil cross section of the blade of interest and it has been determined that the above enumerated advantages are still gained by this airfoil when the chart quantities vary throughout a range of ±3 percent.

The preferred embodiment of my blade has the airfoil designation SC-1095 because it cannot be described by the standard NACA designation system. In the designation given above, that is, SC-1095, the first two digits, 1 and 0, designate the fact that my blade must be shaped in cross section to theoretically produce a coefficient of lift of 0.10 at 0° angle of the blade The third and fourth digit, 9 and 5, designate the fact that our blade is of a thickness-to-chord ratio, i.e., $t/C$, or 9.5 percent. The following table can be used to establish the upper airfoil locations and the lower airfoil locations $Y_u$ and $Y_L$, respectively, at each chord station, X/C, along the blade chord.

| X/C | $Y_u/C$ | $Y_L/C$ |
|---|---|---|
| 0 | 0 | 0 |
| .0125 | 0.0177 | −.0145 |
| 0.025 | 0.0264 | −.0210 |
| 0.05 | 0.03677 | −.02843 |
| 0.075 | 0.04275 | −.03225 |
| 0.10 | 0.0468 | −.03460 |
| 0.15 | 0.0517 | −.0374 |
| 0.20 | 0.05447 | −.03883 |
| 0.25 | 0.0555 | −.0394 |
| 0.30 | 0.05524 | −.03916 |
| 0.40 | 0.05299 | −.03761 |
| 0.50 | 0.04854 | −.03446 |
| 0.60 | 0.04212 | −.02988 |
| 0.70 | 0.03375 | −.02384 |
| 0.80 | 0.02362 | −.01658 |
| 0.90 | 0.01235 | −.00864 |
| 0.975 | 0.00328 | −.00232 |
| 1.0 | 0 | 0 | where X is the station along the blade chord, C is the blade chord dimension, $Y_u$ is the location of the upper airfoil surface, and $Y_L$ is the location of the lower airfoil surface.

The second table given immediately above differs from the first table in that it defines the specific coordinates for the SC-1095 blade, which has a 9.5 percent thickness-to-chord ($t/C$) ratio. The first table given herein is more flexible and, by utilizing the procedures described in connection therewith, the upper and lower airfoil stations can be determined for any thickness-to-chord ratio.

The airfoil cross section of my blade can also be expressed by the following equation:

$$0 \leq \frac{x}{c} \leq .25 \begin{cases} \frac{y_u}{c} = \frac{t}{c}\left[1.307\sqrt{\frac{x}{c}} + 3.767\frac{x}{c} - 46.7\left(\frac{x}{c}\right)^2 + 201.3\left(\frac{x}{c}\right)^3 - 316.8\left(\frac{x}{c}\right)^4\right] \\ \frac{y_L}{c} = \frac{t}{c}\left[-1.162\sqrt{\frac{x}{c}} - 2.256\frac{x}{c} + 37.2\left(\frac{x}{c}\right)^2 - 170.2\left(\frac{x}{c}\right)^3 + 272.9\left(\frac{x}{c}\right)^4\right] \end{cases}$$

$$.25 \leq \frac{x}{c} \leq 1.0 \begin{cases} \frac{y_u}{c} = \frac{t}{c}\left[6.6134\left(\frac{x}{c}\right) - 28.04\left(\frac{x}{c}\right)^2 + 56.42\left(\frac{x}{c}\right)^3 - 56\left(\frac{x}{c}\right)^4 + 21.15\left(\frac{x}{c}\right)^5\right] \\ \frac{y_L}{c} = \frac{t}{c}\left[-4.7661\left(\frac{x}{c}\right) + 20.53\left(\frac{x}{c}\right)^2 - 41.92\left(\frac{x}{c}\right)^3 + 42\left(\frac{x}{c}\right)^4 - 16\left(\frac{x}{c}\right)^5\right] \end{cases}$$

where X is a station along the blade chord, where C is the blade chord dimension, where $Y_u$ is the distance of the upper airfoil at chord station X above the chord, where t is the blade maximum thickness, where $Y_L$ is the distance of the lower airfoil surface of the blade at chord station X from the chord, where $\rho_u$ is the leading edge radius of the blade upper airfoil taken from a point along the blade chord, and where $\rho_L$ is the leading edge radius of the lower airfoil section taken from a point along the blade chord.

Similar to the tables given above, an airfoil section rendering the benefits of my teachings will be derived by following the formula to ascertain all necessary coordinates $Y_u$ and $Y_L$ for each chord station X, and $\rho_u$ and $\rho_L$, and within a range of ± 3 percent of these $Y_u$, $Y_L$, $\rho_u$ and $\rho_L$ values.

Utilizing my blade, a high lift airfoil capability is obtained by delaying or minimizing the leading and trailing edge flow separation. The leading edge flow separation is delayed by reducing the adverse pressure gradients in the region of the leading edge. The trailing edge flow separation is minimized by reducing the airflow surface slope and high rearward suction pressures to a minimum.

Figure 2:
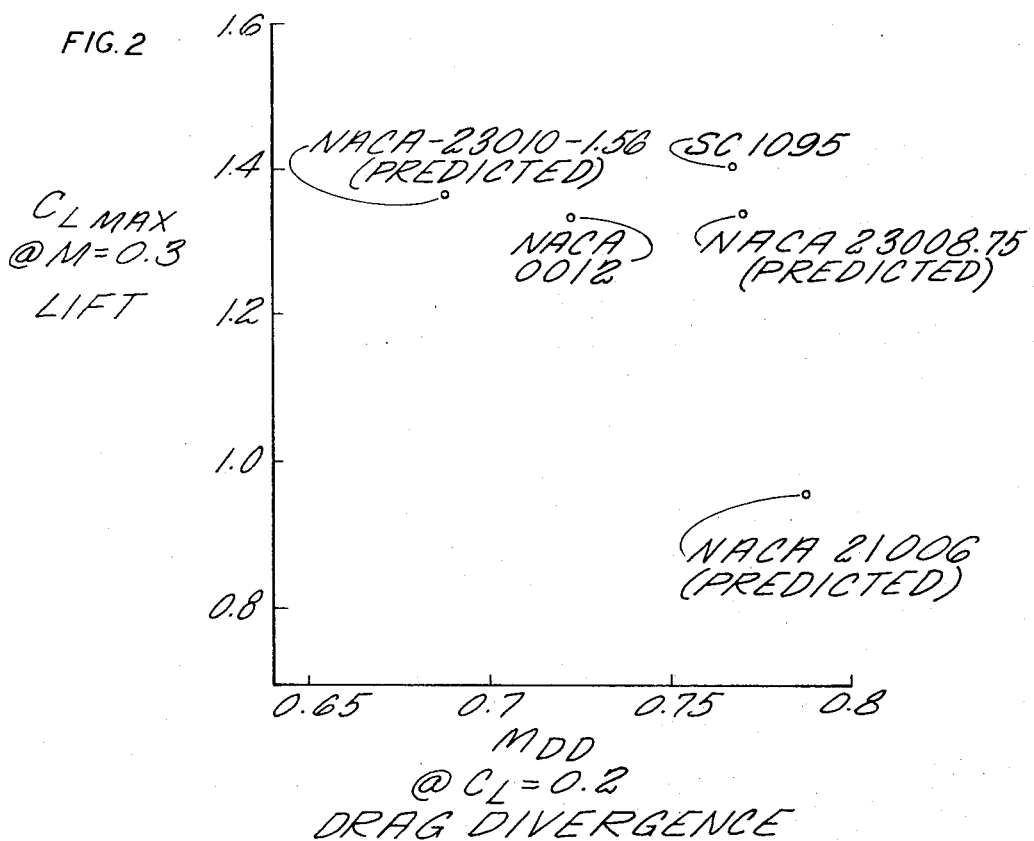
FIG. 2 is a graph showing the lift capability and drag divergents of my blade in comparison to that of the standard blade and theoretical performance of some other airfoil sections which are known to differ from the standard.

To illustrate the advantage of my blade SC-1095 over the standard helicopter blade, NACA 0012, and three other airfoil sections which deviate therefrom, namely the NACA 21006, NACA 23010-1.56 and NACA 23008.75, reference will now be made to FIG. 2. There is little published wind tunnel test performance information on these three airfoil sections and therefore FIG. 2 is generated by utilizing theoretical prediction methods to determine blade performance. Accordingly, the performance points of these three airfoil sections on the FIG. 2 chart are by prediction, whereas the performance points oF the NACA 0012 and my SC-1095 are from actual wind tunnel test results. These prediction methods include drag divergence Mach number calculations using the method published by J. Weber in "The Calculation of the Pressure Distribution on the Surface of Thick Cambered Wings and the Design of Wings with Given Pressure Distribution," ARC R & M 3026, June 1955. The low Mach number $C_{Lmax}$ predictions were made using a Sikorsky developed semi-empirical method utilizing wind tunnel test data and the theoretical pressure distribution around the airfoil. The theoretical pressure gradient around the airfoil leading edge is compared to that of a comparable thickness airfoil of the NACA OOXX series. From the comparison (modified as necessary to incorporate the effects of trailing edge flow separation) the $C_{Lmax}$ prediction of the airfoil is obtained based on the wind tunnel test $C_{Lmax}$ for the NACA OOXX series of airfoils.

The vertical coordinate of FIG. 2 is lift as represented by $C_{Lmax}$ at a Mach number of 0.3. This is actually representative of the maximum lift capacity of the blade or airfoil. The X coordinate represents "drag divergence Mach number" and is designated by $M_{DD}$ at $C_L = 0.2$. The X coordinate is actually the blade Mach number at which drag problems become very severe. Comparing my blade SC-1095 to the standard NACA 0012, it will be noted that my blade generates more lift and is capable of being operated at a higher Mach number without a drag penalty. By drag divergence we mean, from wind tunnel test drag data, that Mach number at which the slope of the drag coefficient-Mach number curve (at constant lift coefficient) becomes equal to 0.1; and theoretically that Mach number at which the surface shock wave is on the crest of the airfoil.

Comparing my blade SC-1095 with the NACA 23010-1.56 airfoil, FIG. 2 clearly illustrates that theoretically that while the NACA 23010-1.56 airfoil generates greater lifting power than the NACA 0012 standard, it does not generate as much lifting power as does my SC-1095 blade, and has much less theoretical drag divergence Mach number, in that drag problems set in at a much lower speed. Therefore in the NACA 23010-1.56 airfoil increase lift above the NACA 0012 standard is accomplished at the expense of flight speed at constant power, or at the expense of power at constant flight speed. Comparing my blade SC-1095 to the NACA 21006 airfoil, it will be noted that while the NACA 21006 airfoil has theoretically better drag divergence Mach number tolerance, it has theoretically minimal lift capability which clearly illustrates the previously expounded theory that by thinning a blade you can cause drag divergence to set in at a higher speed, nonetheless, this is accomplished at the sacrifice of lift capability. Finally, comparing my blade SC-1095 to the NACA 23008.75 airfoil, it will be noted that the NACA 23008.75 airfoil has theoretically comparable drag divergence Mach number characteristics to mine, but it does nor theoretically generate the same amount of lift, despite the fact that the airfoil has been thinned more and cambered more than my SC-1095 airfoil.

FIG. 2 clearly shows that blade SC-1095 compares theoretically very favorably from a drag divergence standpoint with both the NACA 23008.75 and NACA 21006 airfoils, and is theoretically superior to both in lift capability. Further, our blade is superior theoretically to the NACA 23010-1.56 airfoil in lift capability, and is vastly superior theoretically thereto in drag divergence mach number.

One of the advantages of my blade SC-1095 over the NACA 23008.75 and NACA 21006 airfoils is that our blade is a thicker blade and can therefore be structurally a stronger blade with the attended advantages thereof.

To emphasize structural distinctions between the cross section of my blade and the blades using the NACA 23008.75 and NACA 23010-1.56 airfoils, which are the closest known blades, reference will now be made to FIGS. 3 and 4.

Figure 3:
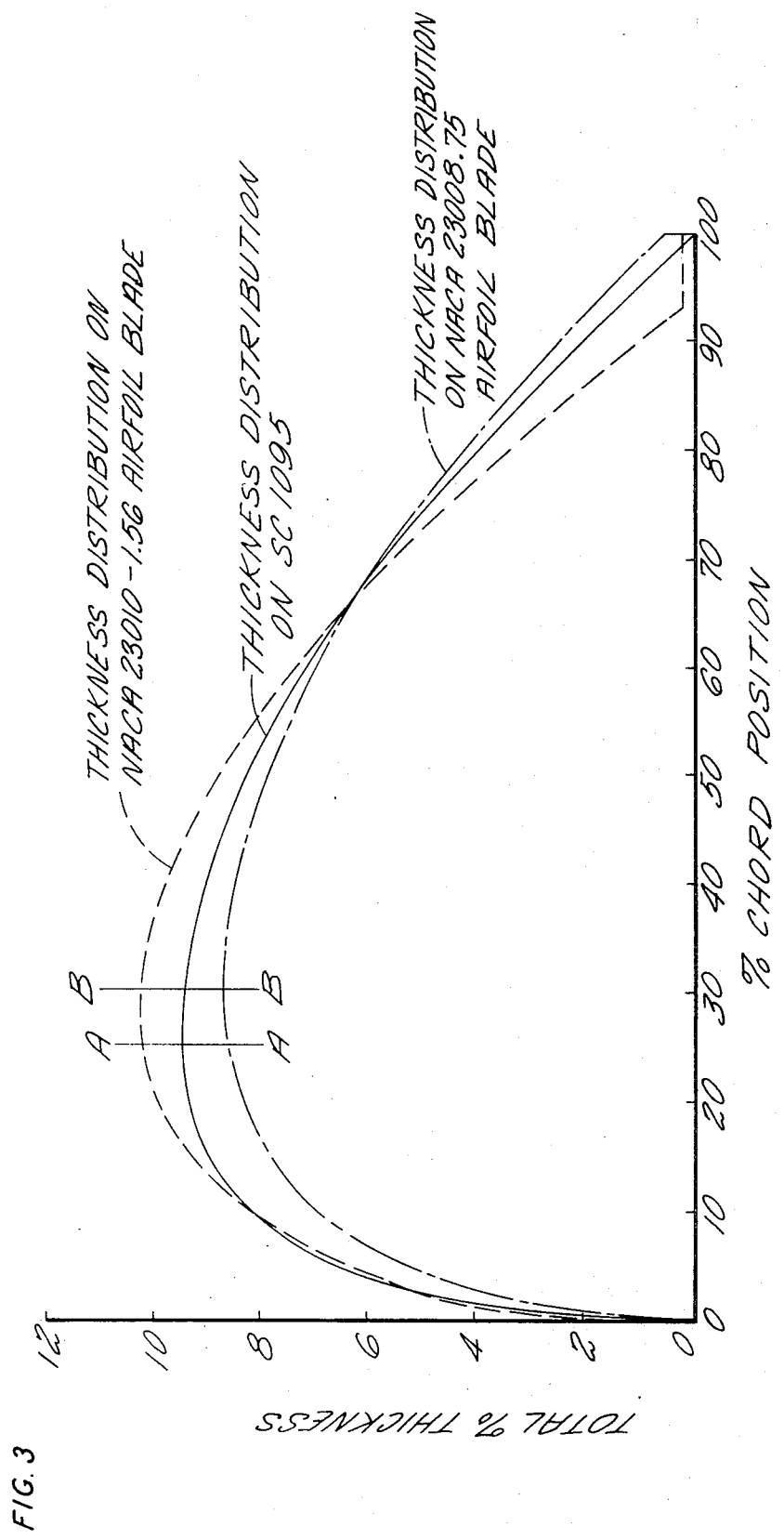
FIGS. 3 and 4 are graphs comparing my blade to the two closest known blades thereto from a thickness distribution and from a camber distribution standpoint, respectively.

FIG. 3 is a graphic representation of the thickness distribution of my blade SC-1095 compared with the NACA 23008.75 and NACA 23010-1.56 blades. The X coordinate is the percent chord position, which we have previously designated as X/C, and the Y coordinate is the total percent thickness ($t$). By way of definition, "thickness distribution" means the thickness of the blade, disregarding the fact that it is a cambered blade, about the "means line." It may be considered that the "mean line" would be the chord of the blade of an uncambered blade. Similarly, the "-mean line" is the center of symmetry of the blade and is not affected by the fact that it is a chambered blade. FIG. 3 shows that my blade is not as thick as the NACA 23010-1.56 airfoil blade but it is thicker than the NACA 23008.75 airfoil blade. It also shows that maximum thickness occurs in the NACA 23010-1.56 and NACA 23008.75 airfoil blades at station B—B, which is the 30 percent chord line, and occurs farther forward in my SC-1095 blade at station A—A, which is at 25 percent chord line. It will be further noted by viewing the far left portion of the FIG. 3 graph that the rate of thickness of my blade increases as rapidly at least as does the NACA 23010-1.56 airfoil blade and much more rapidly than does the NACA 23008.75 airfoil blade.

Figure 4:
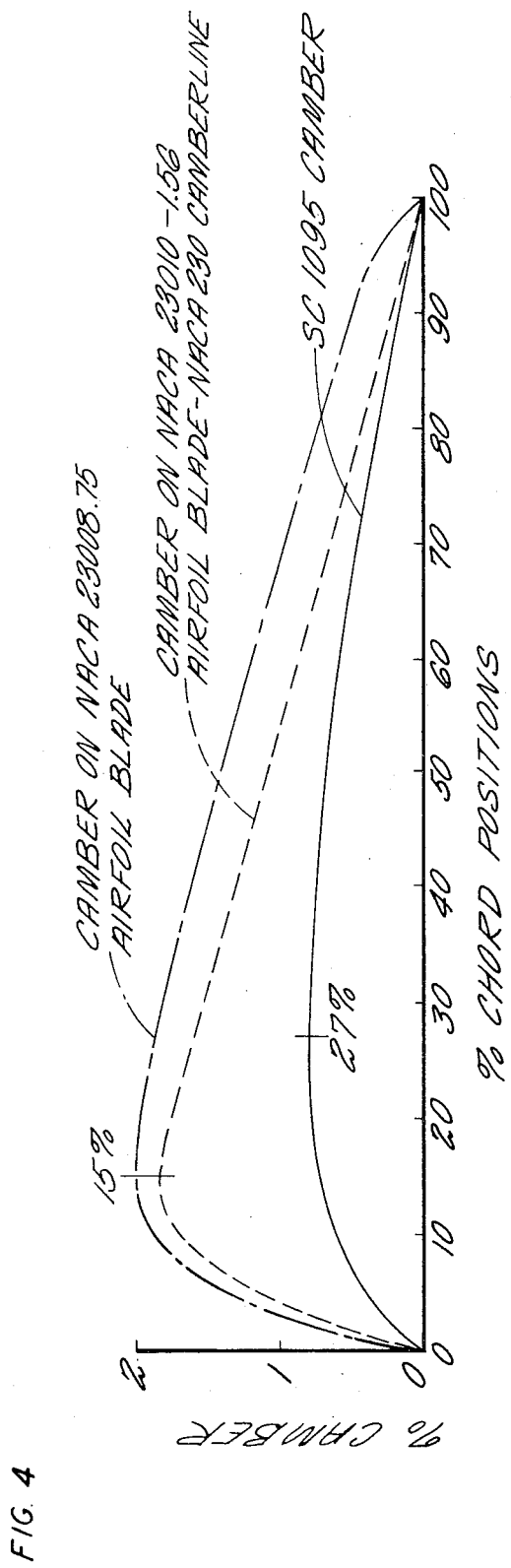

FIG. 4 is a plot of camber distribution of my blade as compared to the NACA 23008.75 and NACA 23010-1.56 airfoil blades. It will be noted from FIG. 4 that my blade is of less camber at all chord stations than either of the other blades and that it, in fact, reaches maximum camber farther aft on the blade, namely at the 27 percent chord line, whereas the other two blades reach maximum camber at the 15 percent chord line.

As previously stated, camber may be used to increase the lift capability of a helicopter blade but, may introduce drag and pitching moment problems therewith. Actually, a theoretical zero pitching moment chamber line can be drawn and our camber line, shown in FIG. 4, much more closely approximates the ideal camber line than do the camber lines of the other two blades. The significance of the difference in camber distribution is indicative of the fact that while the NACA 23008.75 and NACA 23010-1.56 airfoil blades use a standard NACA 230 camber as a means to increase blade lift capabilities, we use camber and thickness in combination for this same important purpose and also in such a way as to minimize pitching moment and minimize drag. The blade is treated as a complete entity rather than the combination of separately determined camber and thickness distributions. It is possible that the NACA 23008.75 airfoil reduced some potential problems created by the addition of camber by thinning the blade extensively. My camber distribution is such that we do not have to go to this degree of thinning and thereby gain the advantage of a stronger structural blade with theoretically greater load carrying capabilities. The NACA 23010-1.56 airfoil blade achieves its lift potential through camber, as illustrated in FIG. 4, but it is possible that this is produced at the expense of increased drag especially at the higher Mach numbers. Since the aircraft utilizing the NACA 23008.75 airfoil blade included a fixed wing as well as a helicopter rotor, that aircraft does not have to rely upon the rotor blades solely for lift generation at high flight speeds, and therefore the blades can be thinned more than would be the case for a helicopter which does not have fixed wings.

Generally speaking, my blade will be of constant chord, with the only chord variation taking place at the blade tip portion 20, that is, the outer 5 or 6 percent of the blade, and there the thickness will preferably be varied proportional to chord so as to maintain the SC-1095 cross-sectional shape. In a modified form, tip portion 20 could be thinned theoretically, and possibly in light load situation, the SC-1095 blade cross section would be used throughout the full span of the blade, however, in our preferred embodiment, the inner portion of the blade at root portion 18, which may extend for the inner 50 percent of the span, is thickened for load carrying purposes, and the remainder of the blade is made to the SC-1095 cross section, and such can be accomplished without material sacrifice since the major part of the blade lifting work is done in the outer 50% of the blade span.

My airfoil so defined is of thickness about 9.5 percent chord dimension and is of forward camber, having a maximum camber of about $0.8 \pm 0.05$ percent chord dimension, and with the maximum camber being located forward of the 30 percent chord station, and preferably at about the 27 percent chord station. Our theoretical and test analysis of this airfoil demonstrates that it has a low pitching moment coefficient within the range $\pm 0.03$ before moment divergence at all Mach numbers below 0.75 and that this low blade pitching moment is established without sacrificing higher maximum lift coefficient and drag divergence.

I wish it to be understood that I do not desire to be limited to the exact details of construction shown and described, for obvious modifications will occur to a person skilled in the art.

I claim:

1. A helicopter blade having a chord, thickness, and a span and further having:

A. a root portion adapted to be connected to a rotor hub,
   B. a tip portion defining the blade portion farthest from said root portion,
   C. a central portion extending between and attached to said root portion and said tip portion and cooperating therewith to define blade span and being shaped to define an airfoil of cross section in accordance with the equation:

$$0 \leq \frac{x}{c} \leq .25 \begin{cases} \frac{y_u}{c} = \frac{t}{c}\left[1.307\sqrt{\frac{x}{c}} + 3.767\frac{x}{c} - 46.7\left(\frac{x}{c}\right)^2 + 201.3\left(\frac{x}{c}\right)^3 - 316.8\left(\frac{x}{c}\right)^4\right] \\ \frac{y_L}{c} = \frac{t}{c}\left[-1.162\sqrt{\frac{x}{c}} - 2.256\frac{x}{c} + 37.2\left(\frac{x}{c}\right)^2 - 170.2\left(\frac{x}{c}\right)^3 + 272.9\left(\frac{x}{c}\right)^4\right] \end{cases}$$

$$.25 \leq \frac{x}{c} \leq 1.0 \begin{cases} \frac{y_u}{c} = \frac{t}{c}\left[6.6134\left(\frac{x}{c}\right) - 28.04\left(\frac{x}{c}\right)^2 + 56.42\left(\frac{x}{c}\right)^3 - 56\left(\frac{x}{c}\right)^4 + 21.15\left(\frac{x}{c}\right)^5\right] \\ \frac{y_L}{c} = \frac{t}{c}\left[-4.7661\left(\frac{x}{c}\right) + 20.53\left(\frac{x}{c}\right)^2 - 41.92\left(\frac{x}{c}\right)^3 + 42\left(\frac{x}{c}\right)^4 - 16\left(\frac{x}{c}\right)^5\right] \end{cases}$$

where X is a chord station measured from the blade leading edge, C is the chord dimension, $t$ is maximum blade thickness, $Y_u$ is the upper airfoil location at station X, and $Y_L$ is the lower airfoil location at X and where the leading edge radii can be defined by the following equations:

$$\rho_u/c = (t/c)^2 \,(0.01/0.095^2)$$

$$\rho_L/c = (t/c)^2 \,(0.0066/0.095^2)$$

where $\rho_u$ is the leading edge radius of the blade upper airfoil and $\rho_L$ is the leading edge radius of the lower blade airfoil, both taken from a point on the blade chord and within a range of ± 3 percent of the values of $Y_u$, $Y_L$, $\rho_u$ and $\rho_L$ so calculated.

2. A blade according to claim 1 wherein said root portion is thicker than said central portion, and wherein said tip portion is thinner than said central portion.

3. Apparatus according to claim 1 wherein said tip portion is also defined by the given equation.

4. A helicopter blade having a chord, thickness, and a span and further having:
  A. a root portion adapted to be connected to a rotor hub,
  B. a tip portion defining the blade portion farthest from said root portion,
  C. a central portion extending between and attached to said root portion and said tip portion and cooperating therewith to define blade span and being shaped to define an air-foil of cross section defined by the coordinate system:

| X/C | $Y_u/t$ | $Y_L/t$ |
|---|---|---|
| 0.0125 | 0.1863 | −.1526 |
| 0.025 | 0.2737 | −.221 |
| 0.05 | 0.387 | −.2993 |
| 0.075 | 0.45 | −.3395 |
| 0.1 | 0.4926 | −.3642 |
| 0.15 | 0.5442 | −.3937 |
| 0.2 | 0.5734 | −.4087 |
| 0.25 | 0.5842 | −.4147 |
| 0.3 | 0.5815 | −.4122 |
| 0.4 | 0.5578 | −.3959 |
| 0.5 | 0.5109 | −.3627 |
| 0.6 | 0.4434 | −.3145 |
| 0.7 | 0.3553 | −.2509 |
| 0.8 | 0.2486 | −.1745 |
| 0.9 | 0.13 | −.0905 |
| 0.975 | 0.0345 | −.0244 | where X is a chord station measured form the blade leading edge, C is the chord dimension, $t$ is maximum blade thickness, $Y_u$ is the upper airfoil location at station X and $Y_L$ is the lower airfoil location at station X and where the leading edge radii can be defined by the following equations:

$$(\rho_u/c) = (t/c)^2\, 1.018$$

$$(\rho_L/c) = (t/c)^2\, 0.7313$$

where $\rho_u$ is the leading edge radius of the blade upper airfoil section taken from a point on the blade chord, wherein C is the chord dimension, wherein $t$ is maximum blade thickness and where $\rho_L$ is the leading edge radius of the blade lower airfoil section taken from a point on the blade chord and within a range of ±3 percent of the values of $Y_u/t$, $Y_L/t$, $\rho_u$ and $\rho_L$ so determined.

5. A blade according to claim 4 wherein said root portion is thicker than said central portion and wherein said tip portion is thinner than said central portion.

6. Apparatus according to claim 4 wherein said tip portion is also defined by said coordinate system.

7. A helicopter blade having a thickness, a span and a chord, and further having:
  A. A root portion adapted to be connected to a rotor hub,
  B. a tip portion defining the blade portion farthest from said root portion,
  C. a central portion extending between and attached to said root portion and said tip portion and cooperating therewith to define blade span and being shaped to define an airfoil of cross section defined by the coordinate system:

| X/C | $Y_u/C$ | $Y_L/C$ |
|---|---|---|
| 0.00 | 0.00 | .00 |
| 0.0125 | 0.0177 | −.0145 |
| 0.025 | 0.0264 | −.0210 |
| 0.05 | 0.03677 | −.02843 |
| 0.075 | 0.04275 | −.03225 |
| 0.10 | 0.0468 | −.03460 |
| 0.15 | 0.0517 | −.0374 |
| 0.20 | 0.05447 | −.03883 |
| 0.25 | 0.0555 | −0.0394 |
| 0.30 | 0.05524 | −.03916 |
| 0.40 | 0.05299 | −.03761 |
| 0.50 | 0.04854 | −.03446 |
| 0.60 | 0.04212 | −.02988 |
| 0.70 | 0.03375 | −.02384 |
| 0.80 | 0.02362 | −.01658 |
| 0.90 | 0.01235 | −.00864 |
| 0.975 | 0.00328 | −.00232 |
| 1.0 | 0.00 | .00 | where X is the station along the blade chord, C is the blade chord dimension, Y is the location of the upper airfoil surface at station X, and $Y_L$ is the location of the lower airfoil surface at station X, and wherein the leading edge radius of the upper airfoil is 0.010 taken from a point on the blade chord and wherein the leading edge radius of the lower airfoil is 0.0066 taken from a point on the blade chord and within a range of ± 3 percent of the given values of $Y_u/C$ and $Y_L/C$ so determined.

8. A blade according to claim 7 wherein said root portion is thicker than said central portion and wherein said tip portion is thinner than said central portion.

9. Apparatus according to claim 7 wherein said tip portion is also defined by said coordinate system.

10. A helicopter blade having a thickness, a span and a chord, and further having:
  A. a root portion adapted to be connected to a rotor hub,
  B. a tip portion defining the blade portion farthest from said root portion,
  C. a central portion extending between and attached to said root portion and said tip portion and cooperating therewith to define blade span and having a thickness of about 9.5 percent chord dimension and a forward camber, with maximum camber at about 0.8 ± 0.05 percent chord dimension and being located forward of the 30 percent chord station and shaped so as to have a blade pitching moment coefficient within the range ± 0.03 before moment divergence at all Mach numbers below 0.75 to thereby produce low blade pitching moments without sacrificing higher maximum lift coefficient and drag divergence.

* * * * *